United States Patent [19]

Uchikoshi

[11] Patent Number: 5,119,249

[45] Date of Patent: Jun. 2, 1992

[54] TRACKING ERROR DETECTION CIRCUIT USING PILOT SIGNALS DURING TAPE REPRODUCTION

[75] Inventor: Gohji Uchikoshi, Higashimurayama, Japan

[73] Assignee: Nakamichi Corporation, Tokyo, Japan

[21] Appl. No.: 410,154

[22] Filed: Sep. 20, 1989

[30] Foreign Application Priority Data

Sep. 22, 1988 [JP] Japan .................. 63-237924
Sep. 22, 1988 [JP] Japan .................. 63-237925

[51] Int. Cl.$^5$ .............................. G11B 5/584
[52] U.S. Cl. .................. 360/77.15; 360/77.14
[58] Field of Search ............... 360/18, 19.1, 27, 31, 360/32, 77.14, 77.15

[56] References Cited

U.S. PATENT DOCUMENTS 4,714,971 12/1987 Sigiki et al. .................. 360/77.15
4,839,755 6/1989 Yamada et al. .................. 360/77.14

Primary Examiner—Aristotelis Psitos
Assistant Examiner—Steven R. Garland
Attorney, Agent, or Firm—Pearne, Gordon, McCoy & Granger

[57] ABSTRACT

An error detection circuit for a helical scanning type magnetic reproducing apparatus including a rotary drum having a first head and a second head provided on the periphery thereof for reproducing pilot signals recorded on a first area and a second area of respective tracks of a magnetic tape adjacent to the widthwise edges of the tape whereby height error of the heads, an inclination error of the rotary drum and tracking error due to the height error or inclination error are detected on the pilot signals so that tracking control is made. The error detection circuit includes at least two sample and hold circuits to sequentially sample and hold a level difference between a pair of pilot signals on either of the first or second tracks. The pilot signals are detected by one of the first or second heads with different first and second timings in synchronization with a detection of a synchronizing signal recorded on another track which corresponds to either of the first or second areas. An operational circuit estimates the selected ones of the outputs from the sample hold circuits.

1 Claim, 7 Drawing Sheets

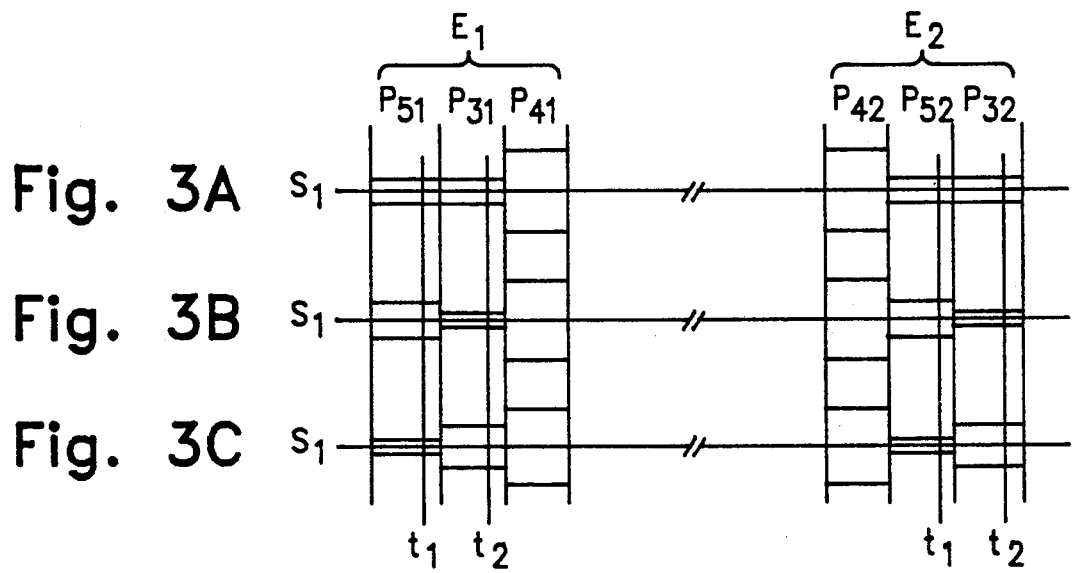
Fig. 3A
Fig. 3B
Fig. 3C
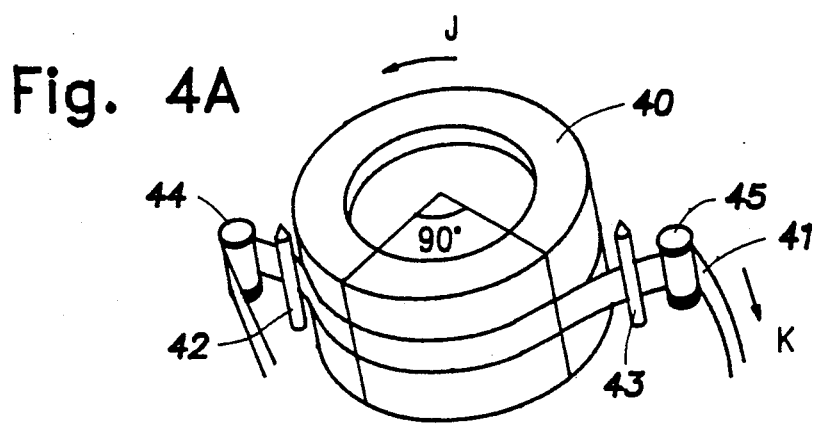
Fig. 4A
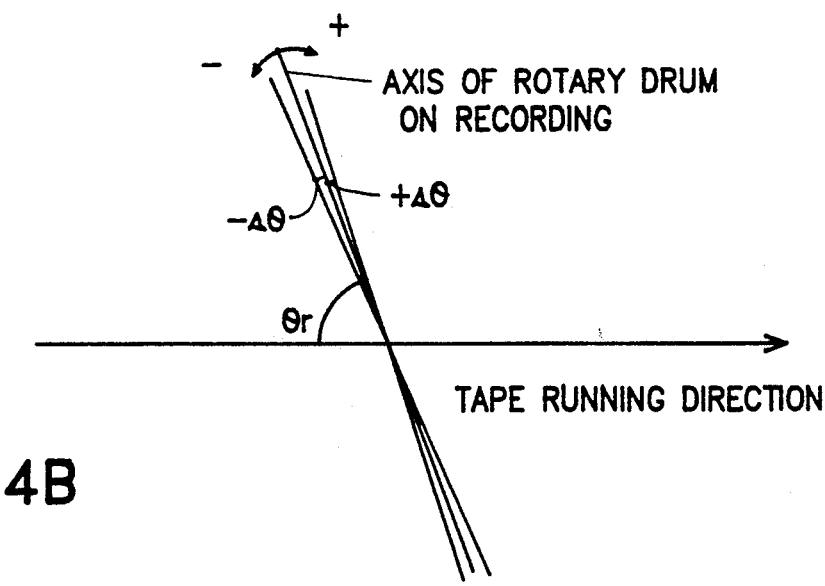
Fig. 4B

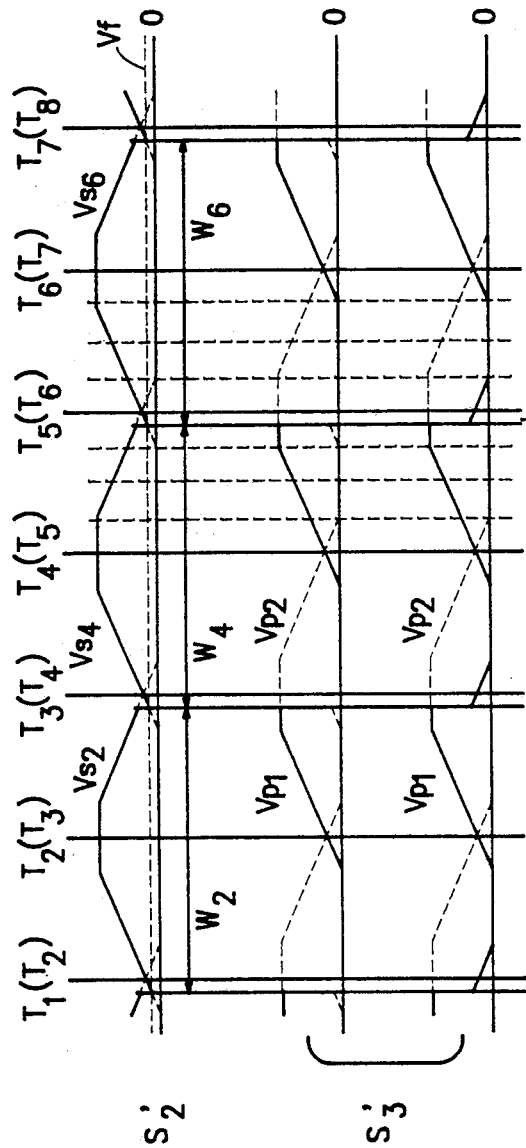
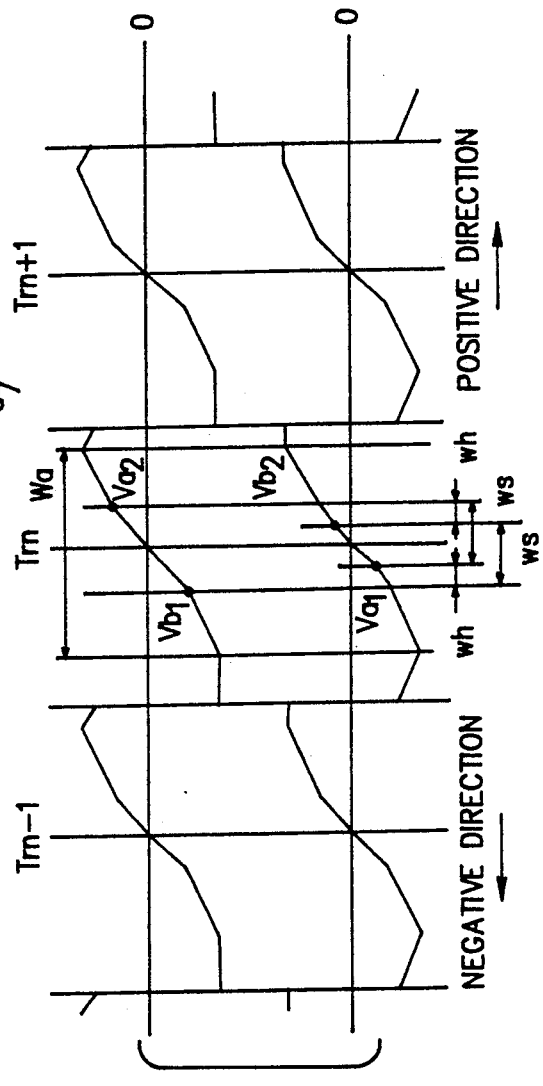
Fig. 5A
Fig. 5B
Fig. 5C
Fig. 5D
Fig. 5E

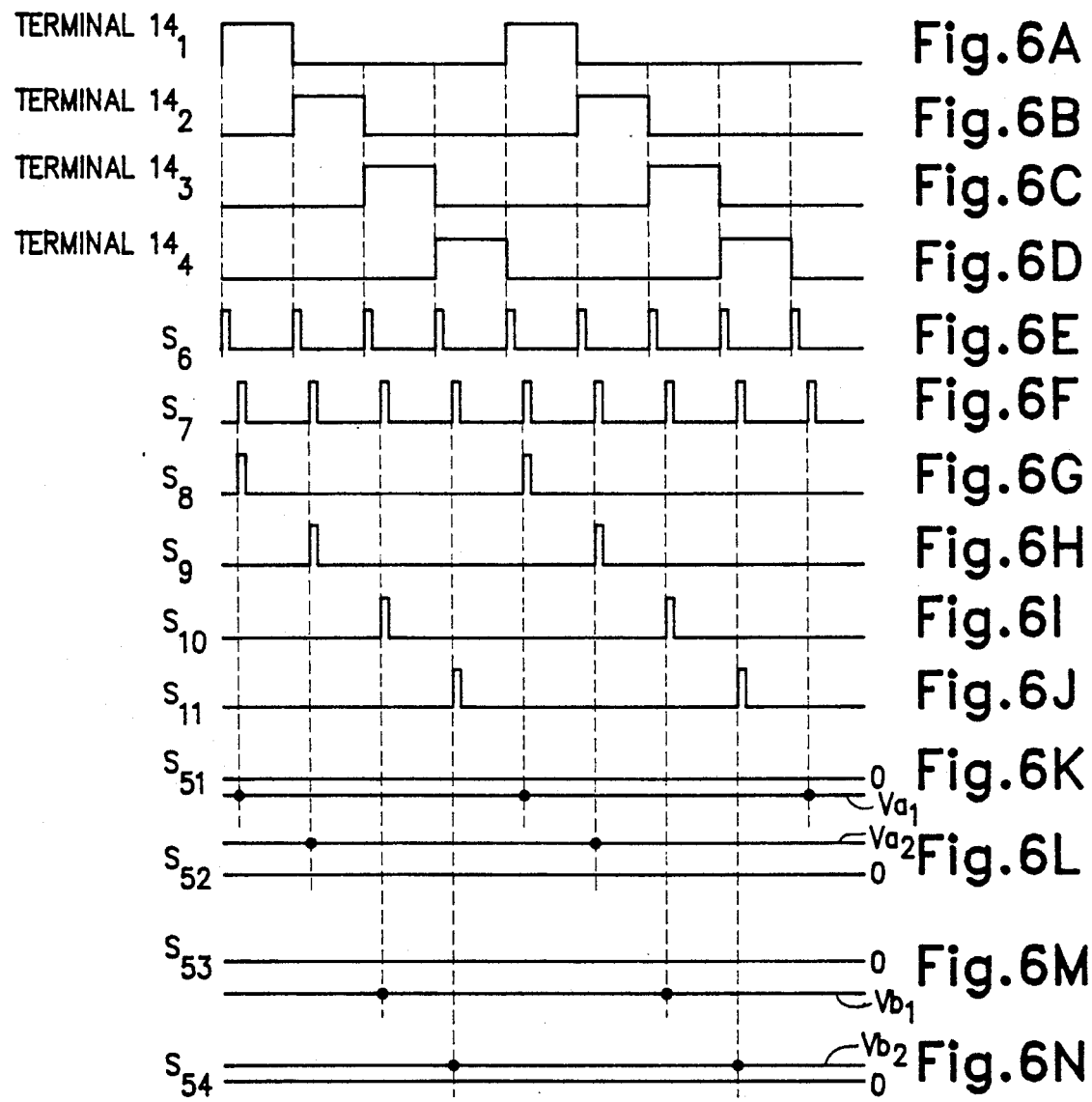

TRACKING ERROR DETECTION CIRCUIT USING PILOT SIGNALS DURING TAPE REPRODUCTION

BACKGROUND OF THE INVENTION

Tracking control of a digital audio tape recorder (DAT) is made by an automatic tracking following system (ATF system), the principles of which will be described with reference to FIGS. 2 through 4.

FIG. 4A illustrates the relationship between a rotary drum 40 of a DAT and a running path of a magnetic tape 41. The rotary drum 40 has two heads ha and hb (not shown) provided at the same height but spaced apart from each other on the periphery of the drum so that the same movement locus can be obtained. The rotary drum 40 rotates in a direction indicated by J at 2000 r.p.m. The magnetic tape 41 moves in a direction indicated by K at a tape velocity of v along the tape running path. The magnetic tape is provided with guide rollers 44 and 45 for controlling its movement in widthwise direction along the rotary drum 40 and inclined pins 42 and 43. An angle at which the magnetic tape 41 is wound on the rotary drum 40 is set to be approximately 90 degrees if an outer diameter of the rotary drum 40 is 30 mm, while an angle between the tape running direction and a rotary axis of the rotary drum 40 is equal to a reference angle $\theta r$.

FIG. 4B illustrates the reference angle $\theta r$ between the tape running direction at the tape winding portion and the rotary axis of the rotary drum 40 in a plane face.

Referring now to FIG. 2, there are shown the ATF areas of track pattern in an enlarged manner. The ATF areas are indicated by $E_1$ and $E_2$ adjacent to the edges of the magnetic tape 41 in a widthwise direction and a PCM area is indicated by $E_3$ on which a PCM signal is recorded. The ATF areas are formed of blocks P (indicated by hatching) on which pilot signals $s_1$ are recorded, respective blocks A and B (indicated by lateral lines and longitudinal lines, respectively) on which synchronizing signals $s_2$ of different frequencies corresponding to the heads ha and hb, respectively, are recorded and blocks D on which IBG signals are recorded.

On reproduction of the signals, the heads ha and hb, which have a width equal to 1.5 times the track width, alternately scan the adjacent tracks of the magnetic tape to reproduce the signals on the magnetic tape. FIGS. 3A, 3B and 3C show the pilot signals $s_1$ reproduced when the head hb scans the track $t_4$. The head hb sequentially scans the blocks $P_{51}$, $P_{31}$ and $P_{41}$ of the ATF area $E_1$ and the blocks $P_{42}$, $P_{52}$ and $P_{32}$ of the ATF are $E_2$ to reproduce the pilot signals $s_1$ recorded on these blocks.

FIG. 3A shows waveforms of the reproduction level of the pilot signals $s_1$ when the head hb normally scans the track $T_4$. As noted from FIG. 3A, at the ATF area $E_1$ the reproduced pilot signals $s_1$ on the block $P_{31}$ on the leftward adjacent track $T_3$ and the block $P_{51}$ on the rightward adjacent track $T_5$ have the same level. Also, at the ATF area $E_2$, the reproduced signals on the blocks $P_{32}$ and $P_{52}$ have the same level. This means that at the ATF areas $E_1$ and $E_2$ the width at which the head hb scans the track $T_3$ is equal to the width at which it scans the track $T_5$ while a center of the width of the track $T_4$ aligns with a center of the width of the head hb.

FIG. 3B shows waveforms of the reproduced signals when the head hb scans the track $T_4$ in an offset manner toward the rightward track $T_5$. It will be noted that the width at which the head hb scans the rightward adjacent track $T_5$ increases while the width at which the head hb scans the leftward adjacent track $T_3$ decreases. Accordingly, as noted from FIG. 3B, the reproduction level of the pilot signal $s_1$ recorded on the track $T_5$ increases in proportion to the offset of the head hb while the reproduction level of the pilot signal $s_1$ recorded on the track $T_3$ decreases in proportion thereto.

FIG. 3C shows waveforms of the reproduction levels of the pilot signals $s_1$ when the head hb scans the track $T_3$ in an offset manner toward the leftward adjacent track $T_3$. At that time, the reproduction level of the pilot signal $s_1$ on the track $T_3$ increases while that on the track $T_5$ decreases.

In this manner, it will be noted that if the head scans in an offset manner from the predetermined track, then the reproduction of the pilot signal $s_1$ on the adjacent track increases or decreases in accordance with the direction and magnitude of offset.

ATF control is accomplished by sequentially detecting a difference between the pilot signals $s_1$ reproduced on the blocks on the adjacent tracks and controlling a rotational velocity of a capstan, which determines the velocity v of the magnetic tape, so that the reproduction levels are equal to each other.

FIG. 7 shows a conventional ATF control system which accomplishes the aforementioned ATF control.

A reproduction signal $s_0$ amplified by an RF amplifier 1 is applied to a low-pass filter 2 for detecting the pilot signals $s_1$ and also to a band-pass filter 3 for detecting the synchronizing signal $s_2$. An envelope detection circuit 4 receives the pilot signal $s_1$, having a reproduction frequency of 130.67 kHz, and supplies a level voltage signal $s_3$, which corresponding to the level of the pilot signal $s_1$, to a subtracter 6 and also to a sample and hold circuit 5 (hereafter referred to as SH circuit). A control circuit 34 receives the synchronizing signal $s_2$ and supplies pulse control signals $s_6$ and $s_7$ at a predetermined timing when the frequency of the synchronizing signal $s_2$ corresponding to the scanning head is confirmed. For example, while the head hb scans the track $T_4$ in FIG. 2, it detects the synchronizing signal $s_2$ when it reaches the block $B_{41}$. When the control circuit 34 confirms that the frequency of the synchronizing signal $s_2$ corresponds to the head hb, it outputs the control signal $s_6$ at the timing $t_1$ of FIG. 3 and the control signal $s_7$ at the timing $t_2$ of FIG. 3, respectively. The SH circuits 5, 32 hold input signals by their control signals $s_6$, $s_7$, respectively. Thus, it will be noted that the SH circuit 5 holds the level voltage signal of the pilot signal detected from the block $P_{51}$ on the rightward adjacent track $T_5$ while the SH circuit 32 holds a level difference signal $s_4$ corresponding to the difference between the level voltage signal held by the SH circuit 5 and the level voltage of the pilot signal detected from the block $P_{31}$ on the leftward adjacent track $T_3$. The holding operations are made every time the respective heads ha and hb detect the corresponding synchronizing signals $s_2$ and, therefore, the hold signal output from the SH circuit 32 becomes a tracking error voltage signal $s_5$ (hereafter referred to as TE voltage signal) indicating a tracking error.

The TE voltage signal $s_5$ is smoothed by a smoothing circuit 33 to provide an average voltage signal $s_{12}$, which is input to a drive circuit 12 for a capstan driving motor 13 which forms a tape transport means. The capstan motor drive circuit 12 rotationally drives a capstan motor 13 so that the input average voltage signal $s_{12}$ becomes 0 level and the tape velocity v is controlled by negative feedback on the average voltage signal $s_{12}$ by means of the ATF control system.

FIGS. 5A and 5B show variations in loci of the synchronizing signal $s_2'$ and the level voltage signal $s_3'$ detected corresponding to the head hb when the center position of the head hb scanning the ATF area $E_1$ moves over the respective tracks. It should be noted that the synchronizing signal $s_2'$ and the level voltage signal $s_3'$ are different from the synchronizing signal $s_2$ and the level voltage signal $s_3$.

A variation in level of the synchronizing signal $s_2'$ shown in FIG. 5A will be described with reference to FIG. 2. A level $Vs_4$ of the synchronizing signal $s_2'$ detected on the block $B_{41}$ becomes the maximum level when the center of the head hb scans the center of the track $T_4$. The level $Vs_4$ never varies until the head hb is offset by a quarter of the track in the positive direction toward the rightward adjacent track $T_5$. However, it linearly decreases when the head hb is further offset in the positive direction because the width at which the head hb passes through the block $B_{41}$ decreases and becomes zero level when the head hb reaches a position $d_4$. At position $d_4$ the head hb is offset by a quarter the track width from the center of the track $T_5$. On the other hand, a level $Vs_6$ of the synchronizing signal $s_2'$ detected on the block $B_{61}$ of the track $T_6$ linearly increases when the head hb passes over a position $d_3$ and becomes the maximum level at a position $d_6$. Thus, the variation in level is repeated in the same manner as the level $Vs_4$ in accordance with the movement of the head hb in the positive direction.

It will be apparent that when the head hb is offset in the negative direction toward the leftward adjacent track $T_3$, the synchronizing signal $s_2'$ is also detected and varies as shown in FIG. 5A. In FIG. 5A, a level $Vs_2$ is a level of the synchronizing signal $s_2'$ detected on the block $B_{21}$ on the track $T_2$.

A variation in level of a level voltage signal $s_3'$ obtained in accordance with the movement of the head hb will hereafter be described with reference to FIGS. 5B and 2.

After it detects the synchronizing signal $s_2'$ having a higher level than a critical value Vf on the blocks B, the control circuit 34 outputs control signals $s_6$ and $s_7$ to detect levels of the pilot signals on the adjacent tracks at the timings of $t_1$ and $t_2$ of FIG. 3A-3C. Thus, when the head hb lies within the range of $w_2$ and the level of the level voltage signal $s_3'$ is on the blocks P, the head hb scans at the predetermined timing of $t_1$ and $t_2$ after it passes through the blocks $B_{21}$ where the synchronizing signal is detected. When the head hb lies within the range of $w_4$, and the level of the level voltage signal $s_3'$ is on the blocks P, the head hb scans at the predetermined timing of $t_1$ and $t_2$ after it passes through the blocks $B_{41}$ where the synchronizing signal is detected. When the head hb lies within the range of $w_6$, and the level of the level voltage signal $s_3'$ is on the blocks P, the head hb scans at the predetermined timing of $t_1$ and $t_2$ after it passes through the blocks $B_{61}$ where the synchronizing signal is detected.

Once the control circuit 34 detects the synchronizing signal, the subsequent synchronizing signal is not detected until the control signals $s_6$ and $s_7$ on the synchronizing signal are output. Therefore, the synchronizing signal at the dotted line portions of FIG. 5A is never detected.

Accordingly, when the scanning center of the head hb lies at the center of the track $T_4$, a level $Vp_1$ of the level voltage signal $s_3'$ provided at the timing of $t_1$ and indicated by a solid line and a level $Vp_2$ of the level voltage signal $s_3'$ provided at the timing of $t_2$ and indicated by a dotted line correspond to a detected level of the pilot signal detected by the head hb on the blocks $P_{51}$ and $P_{31}$, respectively, and have the same level as each other as shown in FIG. 5B. When the scanning position of the head hb is offset in the positive direction, the level $Vp_1$ linearly increases and the level $Vp_2$ linearly decreases. When the head hb reaches the position $d_1$, the level $Vp_2$ becomes zero and, when it reaches the position $d_3$, the level $Vp_1$ becomes maximum. Furthermore, when the head hb passes over the position $d_3$, it begins to detect the pilot signal on the block $P_{61}$ at the timing of $t_2$ and, therefore, the level $Vp_2$ linearly increases. When the head hb passes over the position $d_7$, where the detected level of the synchronizing signal on the block $B_{61}$ exceeds the critical value Vf, it falls within the range $w_6$ and the level of the level voltage signal $s_3'$ on the block P at the predetermined timing of $t_1$ and $t_2$ is provided after it passes over the block $B_{61}$. Accordingly, the level $Vp_1$ becomes zero after it reaches the position $d_6$ and remains zero until it reaches the position $d_7$ where the pilot signal on the block $P_{71}$ is detected. On the other hand, the level $Vp_2$ becomes the detected level of the pilot signal on the block $P_{51}$, is kept at the maximum level until it reaches the position $d_4$ and linearly decreases when it passes thereover. Finally, when the scanning center of the head hb reaches the center of the track $T_6$, the levels $Vp_1$ and $Vp_2$ again are equal, but the respective levels become the detected levels of the pilot signals detected by the head hb on the blocks $P_{51}$ and $P_{71}$, respectively. Also, when the head hb is offset in the negative direction, the levels $Vp_1$ and $Vp_2$ of the pilot signals $s_3'$ are similarly detected and vary as shown in FIG. 5B.

A variation in locus of the level voltage signal $s_3'$ is detected when the scanning position of the head hb moves over the respective tracks at the ATF area $E_2$ will hereafter be described with reference to FIGS. 5A, 5C and 2.

At that time, variation in the locus of the synchronizing signal $s_2'$, varying in accordance with the scanning position of the head hb will be identical to that at the ATF area $E_1$. However, variation in the locus of the level voltage signal $s_3'$ is slightly different from the aforementioned one, as shown in FIG. 5C. More particularly, when the scanning center of the head hb is offset from the center of the track $T_4$ in the positive direction, the respective levels $Vp_1$ and $Vp_2$ vary in the same manner as in the ATF area $E_1$ to the position $d_3$. However, when it passes through the position $d_3$, there is no block P detected at the timing of $t_2$ and therefore the level of $Vp_2$ never increases as at the ATF area $E_1$ and, therefore, is kept at zero. On the other hand, the level $Vp_1$ becomes the detected level of the pilot signal on the block $P_{42}$ after the head hb reaches the position $d_7$ where the detecting blocks of the synchronizing signal changes from $B_{42}$ to $B_{62}$ and linearly decreases as the head hb moves in the positive direction, as shown in FIG. 5C.

Although only the variation in locus of the level of the pilot signal detected at the ATF areas $E_1$ and $E_2$ when the scanning position of the head hb moves between the tracks, the above discussion is also true of the variation in the level of the pilot signal detected when the head ha moves between the tracks. However, it should be noted that in this case, the scanning position of the head ha and the variation in locus of the pilot signal level is offset by one track as indicated by $(T_2)$, $(T_3)$ ———— and $(T_8)$ in FIGS. 5A through 5C. The variation in locus of the pilot signal level at the ATF area $E_1$ is shown by FIG. 5C while that at the ATF area $E_2$ is shown by FIG. 5B. As noted from this, they are opposite of those of the head hb. This is due to the fact that the position of the block B having the synchronizing signal corresponding to the head hb and the block P having the pilot signal at the ATF area $E_1$ is consistent with the relation of position of the block A having the synchronizing signal corresponding to the head ha and the block P having the pilot signal at the ATF area $E_2$.

The TE voltage signal $s_5$ from the SH circuit 32 of FIG. 7 corresponds to a differential voltage $(V_{p1} - V_{p2})$ between the levels $V_{p1}$ and $V_{p2}$ obtained in synchronization with the synchronizing signal meeting the aforementioned conditions. FIG. 5D shows a variation in level which is obtained by subtracting the dotted line from the solid line of FIG. 5B while FIG. 5E shows a variation in level which is obtained by subtracting the dotted line from the solid line of FIG. 5C. Thus, it will be understood that a differential voltage $Va_1$ is obtained by detecting the synchronizing signal corresponding to the ATF area $E_1$ where the head ha is positioned while the scanning position moves between the tracks. Likewise, a differential voltage $Vb_2$ is obtained by detecting the synchronizing signal corresponding to the ATF area $E_2$ where the head hb is positioned while the scanning position moves between the tracks vary, as shown in FIG. 5E. It will also be understood that a differential voltage $Vb_1$ is obtained by detecting the synchronizing signal corresponding to the ATF area $E_1$ where the head hb is positioned while the scanning position moves between the tracks and a differential voltage $Va_2$ is obtained by detecting the synchronizing signal corresponding to the ATF area $E_2$ where the head ha is positioned while the scanning position moves between the tracks vary, as shown in FIG. 5D.

Now, supposing that the rotary drum having heads ha and hb disposed at identical heights on recording and moving along the identical locus rotates at 2000 r.p.m. and having an angle between the axis of the rotary drum and the tape running direction being equal to the reference angle $\theta r$ which corresponds to the angle on recording and that the magnetic tape runs at the tape velocity Vp which is approximately equal to the tape velocity on recording for reproducing the ATF signal from the magnetic tape, the scanning positions of the heads ha and hb scanning the ATF area $E_1$ and $E_2$ are identical to each other relative to the center of the corresponding tracks. In this case, the differential voltages $Vb_1$ and $Va_2$ on the variation of FIG. 5D and the differential voltages $Va_1$ and $Vb_2$ on the variation of FIG. 5E move along the identical axis.

Supposing that the heads ha and hb are offset in height, the scanning positions of the heads relative to the center of the corresponding to the tracks Tr at the ATF area $E_1$ have a height error wh corresponding to the offset height. This is also true of the relation of their positions at the ATF area $E_2$. These height errors wh can be expressed as errors between the movement positions of the differential voltages $Va_1$ and $Vb_1$ and between those of the differential voltages $Va_2$ and $Vb_2$ in FIGS. 5D and 5E, respectively. These figures correspond to the case in which the head hb is positioned lower than the head ha and the lower head is offset in the negative direction.

Supposing that the angle between the axis of the rotary drum and the tape running direction is inclined relative to the reference angle $\theta r$ on recording, the scanning direction of the heads is never parallel to the direction of the tracks on recording. Thus, the scanning positions of the head ha relative to the center of the corresponding track at the ATF area $E_1$ and relative to the center of the corresponding track at the ATF area $E_2$ have an inclination error ws in accordance with their inclination. This is also true of the head hb. These inclination errors ws can be expressed as errors between the movement positions of the differential voltages $Va_1$ and $Vb_1$ and between those of the differential voltages $Va_2$ and $Vb_2$ in FIGS. 5D and 5E, respectively. This corresponds to the case in which the angle between the axis of the rotary drum and the tape running direction is offset by $-\Delta\theta$ relative to the reference angle $\theta r$ in the angle relation of FIG. 4B. In this case, the relation of FIGS. 5D and 5E are provided because of the scanning direction of the heads offset in the clockwise direction.

Thus, it will be understood that the errors wh and ws of the movement position of the heads are inevitably caused by the difference between the head heights on recording and reproducing and the difference between the inclinations of the axis of the rotary drum on recording and reproducing.

The variation in the tape velocity and the offset position of the heads relative to the tracks causes the differential voltages $Va_1$, $Va_2$, $Vb_1$ and $Vb_2$ of the TE voltage signals $s_5$ output from the SH circuit 32 to move along the variation locus of FIGS. 5D and 5E while the errors wh and ws are maintained. For example, if the relationship of the tape velocity Vr on recording and the tape velocity Vp on reproducing is (Vr < Vp), then they move in the positive direction. If it is (Vr > Vp), then they move in the negative direction.

As noted from the foregoing, since the ATF control is accomplished by controlling the tape velocity v so that the average level of the TE voltage signals $s_5$ is zero, the levels of the respective differential voltages are stable at the positions of FIGS. 5D and 5E.

One of the disadvantages of the prior ATF control system is that it tends to deteriorate the reproduction condition. More particularly, the heads ha and hb scan the corresponding tracks by ATF control but, if there is a difference between the inclinations of the rotary drum on recording and reproducing, then the reproduction will be made on the condition that the scanning locus is not parallel to the track direction and if the heads ha and hb scan at different height on recording and on reproducing, then the reproduction will be made on the condition that the center of the track is inconsistent with the center of the heads. This causes the reproduction condition to deteriorate. Since the prior ATF control system cannot detect the height error of the heads and the inclination error of the rotary drum, whether the reproduction condition is allowable cannot be determined.

Also, in the prior ATF control system, the TE voltage signals $s_5$ output from the SH circuit 32 are renewed by the sequential differential voltages $Va_1$, $Va_2$, $Vb_1$, $Vb_2$ of FIGS. 5A through 5E every time the respective heads ha and hb scan the areas $E_1$ and $E_2$. Thus, if there is a head height error and an inclination error of the rotary drum on recording and on reproducing, then there is a large variation in the differential voltage levels in proportion to the magnitude of the errors. The level variation can be normally expressed by the TE voltage signals $s_5$.

Thus, to provide for ATF control the average voltage signal $s_{12}$ having the level variation components removed from the TE voltage signal $s_5$, which variation components cause the errors of height and inclination. This average voltage signal can be obtained by a smoothing circuit, but such a smoothing circuit causes delayed response to information of movement of the head positions on the variation in the tape velocity.

SUMMARY OF THE INVENTION

Accordingly, it is a principal object of the invention to provide an error detection circuit adapted to detect an inclination error of a rotary drum on recording and reproducing.

It is another object of the invention to provide an error detection circuit adapted to detect a height error of two heads on recording and reproducing.

It is a further object of the invention to provide an error detection circuit adapted to detect an average voltage signal for ATF control without a smoothing circuit.

In accordance with the present invention, there is provided an error detection circuit for a helical scanning type magnetic reproducing apparatus including a rotary drum having a first head and a second head provided on the periphery thereof for reproducing pilot signals recorded on a first area and a second area on respective tracks of a magnetic tape adjacent to its end whereby at least one of a height error of said heads, an inclination error of said rotary drum and the tracking error due to said height error and said inclination error is detected on said pilot signals so that tracking control is made, said error detection circuit comprising:

at least two sample and hold circuits to sequentially sample and hold a level difference between the pair of pilot signals on either of said first and second tracks detected by one of said first and second heads with different first and second timings in synchronization with a detection of a synchronizing signal recorded on another track corresponding to either of said first and second areas; and, an operational circuit to estimate the selected ones of the outputs from said sample and hold circuits.

In accordance with one aspect of the invention, the sample and hold circuit group includes a first sample and hold circuit to sequentially sample and hold a level difference between the pair of pilot signals on another track detected by the first head with different first and second timings in synchronization with a detection of a synchronizing signal recorded on said first track corresponding to the first area, a second sample and hold circuit to sequentially sample and hold a level difference between the pair of pilot signals on another track detected by the first head with different first and second timings in synchronization with a detection of a synchronizing signal recorded on the first track corresponding to the second area, a third sample and hold circuit to sequentially sample and hold a level difference between the pair of pilot signals on another track detected by the second head with different first and second timings in synchronization with a detection of a synchronizing signal recorded on the second track corresponding to the first area, and a fourth sample and bold circuit to sequentially sample and hold a level difference between the pair of pilot signals on another track detected by the second head with different first and second timings in synchronization with a detection of a synchronizing signal recorded on the second track corresponding to the second area.

The operational circuit may be a first subtracter to obtain either of a first level difference information between the outputs from the first and third sample and hold circuits and a second level difference information between the second and fourth sample and hold circuits. The first and second level informations correspond to the angle errors of the scanning direction of the heads relative to the track direction in which the heads scan the tracks. In this case, the error detection circuit may comprise only a pair of first and third sample and hold circuits or only pair of second and fourth sample and hold circuits to detect the angle error.

The operational circuit may be a second subtracter to obtain either of a third level difference information between the outputs from the first and second sample and hold circuits and a fourth level difference information between the third and fourth sample and hold circuits. The third and fourth level difference informations correspond to the height errors between the heads. Also, in this case, the error detection circuit may comprise only a pair of first and second sample and hold circuits or only a pair of third and fourth sample and hold circuits to detect the height error.

The operational circuit may be an adder to add all the output from the first through fourth sample and hold circuits to provide an average voltage signal indicating an average center position of the heads relative to the center of the tracks at the ATF areas which the heads scan.

BRIEF DESCRIPTION OF THE DRAWINGS

The above and other objects and features of the invention will be apparent from the description of the embodiments of the invention with reference to the accompanying drawings in which:

FIGS. 3A through 3C illustrate waveforms of reproduction levels when the heads scan the tracks;

FIG. 4A is a perspective view of a rotary drum and a magnetic tape running along heads of the rotary drum;

FIG. 4B illustrates a relative angle of the axis of the rotary drum relative to a tape running direction;

FIGS. 5A through 5E illustrate level variation in synchronizing signals, level voltage signals and differential voltages, respectively;

FIGS. 6A through 6N are time charts illustrating waveforms at the various portions of the system of FIG. 1;

DETAILED DESCRIPTION OF THE PREFERRED EMBODIMENTS

Figure 1:
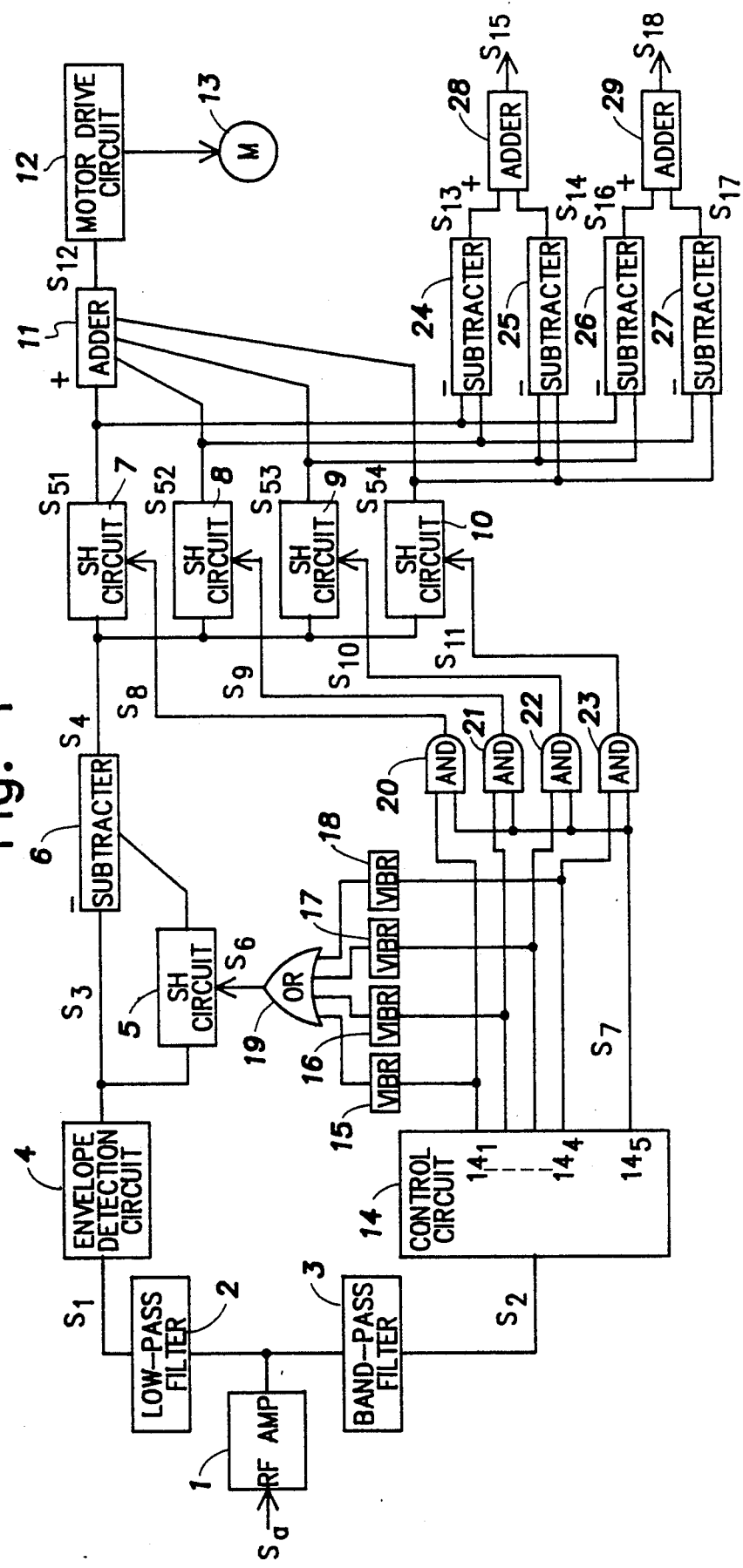
FIG. 1 is a schematic diagram of an ATF control system having an error detecting circuit of the invention.
Figure 7:
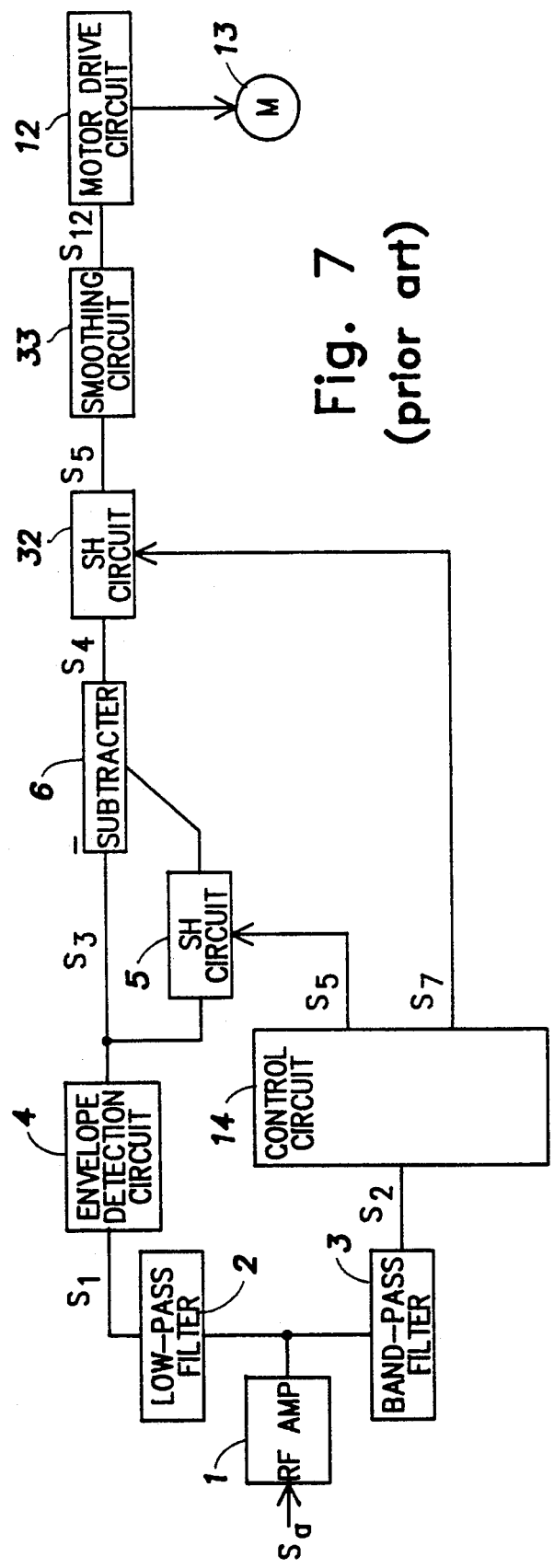
FIG. 7 is a schematic diagram of an ATF control system conventionally used for ATF control.

Referring now to FIG. 1, there is illustrated an ATF control system using the error detection circuit of the present invention wherein the same numerals designate the same components as that of FIG. 7.

A control circuit 14 has output terminals $14_1$ through $14_4$ connected to AND gates 20 through 23 at one input terminal and, also, through respective mono-multivibrators 15 through 18 to an input terminal of an OR gate 19, an output terminal of which is connected to a control signal input terminal of the sample and hold circuit (SH circuit) 5. A control circuit 14 also has an output terminal $14_5$ connected to the AND gates 20 through 23 at their other input terminals.

Sample and hold circuits (SH circuits) 7 through 10 have respective control input terminals connected to output terminals of the AND gates 20 through 23 and normal input terminals connected to an output terminal of the subtracter 6. An output terminal of the SH circuit 7 is connected to an input terminal of an adder 11, a positive input terminal of a subtracter 24 and a positive input terminal of a subtracter 26. An output terminal of the SH circuit 8 is connected to the input terminal of the adder 11, a negative input terminal of the subtracter 24 and a positive input terminal of a subtracter 27. An output terminal of the SH circuit 9 is connected to the input terminal of the adder 11, a positive input terminal of a subtracter 25 and a negative input terminal of the subtracter 26. An output terminal of the SH circuit 10 is connected to the input terminal of the adder 11 and negative input terminals of the subtracters 25 and 27.

An output terminal of the adder 11 is connected to the input terminal of the capstan motor drive circuit 12 for controlling the capstan motor 13. Output terminals of the subtracters 24 and 25 are commonly connected to an input terminal of an adder 28 while output terminals of the subtracters 26 and 27 are commonly connected to an input terminal of an adder 29.

Figure 2:
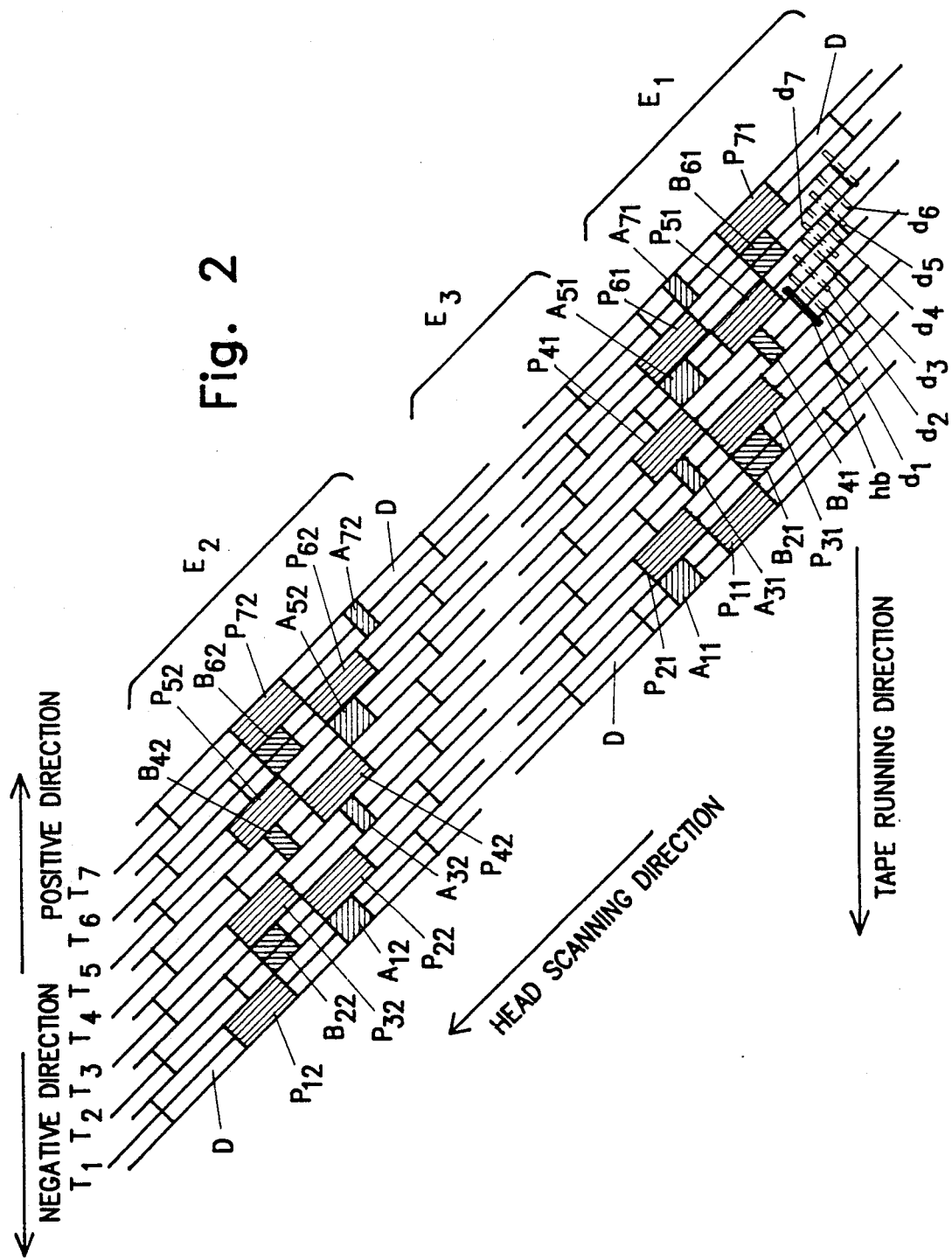
FIG. 2 is an enlarged front view of ATF areas of track patterns recorded, on magnetic tape.

In the ATF control system, the control circuit 14 receives the synchronizing signal $s_2$ from the band-pass filter 3 to prove "H" states of the corresponding output terminals at $t_1$ of FIGS. 3A–3C and output the control signal $s_7$ from the output terminal $14_5$ at timing of $t_2$ after the frequency of the synchronizing signal $s_2$ corresponding to the scanning head is confirmed, and after which of the heads ha and hb detects the signal and at which of the ATF areas $E_1$ and $E_2$ of FIG. 2 the signals are detected are confirmed. More particularly, a waveform of the output signal from the output terminal $14_1$, shown in FIG. 6A, is at a state of "H" on the synchronizing signal $s_2$ detected at the block A when the head ha scans the corresponding track at the ATF area $E_1$. A waveform of the output signal from the output terminal $14_2$, shown in FIG. 6B, is at a state of "H" on the synchronizing signal $s_2$ detected at the block A when the head ha scans the corresponding track at the ATF area $E_2$. Similarly, a waveform of the output signal from the output terminal $14_3$, shown in FIG. 6C, is at a state of "H" on the synchronizing signal $s_2$ detected at the block B when the head hb scans the corresponding track at the ATF area $E_1$ and a waveform of output signal from the output terminal $14_4$, shown in FIG. 6D, is at a state of "H" on the synchronizing signal $s_2$ detected at the block B when the head hb scans the corresponding track at the ATF area $E_2$. As aforementioned, the timing at which the output terminals of the control circuit 14 are at the state of "H" is at $t_1$ of FIG. 3A–3C.

Although how the control circuit 14 distinguishes the heads is not described in detail herein, it can easily distinguish which of the heads scans the tracks by obtaining the rotation information of the rotary drum and, also, whether the scanning heads scan the corresponding tracks by determining the frequency of the synchronizing signals reproduced by the heads. Furthermore, it will be noted that there is a regulation of the synchronizing signals $s_2$ reproduced. If the synchronizing signals detected by the head ha at the ATF areas $E_1$ and $E_2$ are expressed by $sa_1$ and $sa_2$, respectively, and if the synchronizing signals detected by the head hb at the ATF areas $E_1$ and $E_2$ are expressed by $sb_1$ and $sb_2$, respectively, they regularly appear at the sequence of $sa_1$, $sa_2$, $sb_1$, $sb_2$, $sa_1$ ..., and the timings of the state of "H" at the respective output terminals can be easily obtained by using the regulation of the synchronizing signals.

The mono-multivibrators 15 through 18 output pulses of predetermined width in synchronization with a raising-up of the input signals. Accordingly, the pulses of the pulse-like control signal $s_6$ from the OR gate 19 appear at the timing of $t_1$ of FIGS. 3A–3C, as shown in FIG. 6E, every time the heads scan the ATF areas and the SH circuit 5 holds the level voltage of the level voltage signal $s_3$ at the timing of "H".

The AND gates 20 through 23 input the respective control signals from the output terminals $14_1$ through $14_4$ of the control circuit 14 and the control signal $s_7$ from the output terminal $14_5$ thereof and supply AND signals $s_8$ through $s_{11}$, shown in FIGS. 6G through 6J, to the control signal input terminals of the SH circuits 7 through 10. The SH circuits 7 through 10 receive the level difference signal $s_4$ at their normal input terminal and sample-hold it at the timing of "H" of the AND signal. Thus, the SH circuit 7 outputs the TE voltage signal $s_{51}$, renewing the differential voltage $Va_1$, the SH circuit 8 outputs the TE voltage signal $s_{52}$, renewing the differential voltage $Va_2$, the SH circuit 9 outputs the TE voltage signal $s_{53}$, renewing the differential voltage $Vb_1$, and the SH circuit 10 outputs the TE voltage signal $s_{54}$, renewing the differential voltage $Vb_2$.

FIGS. 6K through 6M show the conditions in which the TE voltage signals $s_{51}$ through $s_{54}$, sequentially renewed on the respective differential voltages, are stable at the state of level of FIGS. 5D and 5E. It will be noted that although there is no variation in the differential voltages $Va_1$, $Va_2$, $Vb_1$ and $Vb_2$ of the TE voltage signals from the SH circuits 7 through 10, there is a variation in the differential voltage level every sampling when the positions of the differential voltages of FIGS. 5D and 5E move along their loci.

The adder 11 outputs an added voltage signal $s_{12}$ obtained by adding the TE voltage signals $s_{51}$ through $s_{54}$. The voltage level of the added voltage signal $s_{12}$ corresponds to the average level of the sequentially renewed differential voltages $Va_1$, $Va_2$, $Vb_1$ and $Vb_2$ to indicate an average position of the heads relative to the center of the tracks at the ATF areas $E_1$ and $E_2$ scanned by the heads ha and hb. This varies in accordance with variation in the tape velocity. The capstan motor drive circuit 12 and the capstan motor 13 are operated by receiving the added voltage signal $s_{12}$ in the same manner as the system of FIG. 7.

It should be noted that a smoothing circuit may be provided at a rear stage of the adder 11 in order to obtain a desired characteristic of ATF control, if necessary.

The subtracter 24 outputs an inclination error signal $s_{13}$ which corresponds to a level difference $(Va_1 - Va_2)$ between the TE voltage signals $s_{51}$ and $s_{52}$. The subtracter 25 outputs an inclination error signal $s_{14}$ which corresponds to a level difference $(Vb_1 - Vb_2)$ between the TE voltage signals $s_{53}$ and $s_{54}$. As noted from the description of FIGS. 5D and 5E, the level of the inclination error signals $s_{13}$ and $s_{14}$ appear as a negative voltage when the angle of the rotary drum on reproducing is inclined in a negative direction relative to the angle $\theta r$ of the rotary drum on recording and as a positive voltage when that the former is inclined in a positive direction relative to the latter and the magnitude thereof is approximately proportional to the error angle.

It should be noted that the aforementioned relation can be established only when the differential voltages $Va_1$, $Va_2$, $Vb_1$, and $Vb_2$ fall within the range wa of FIG. 5D. Also, it should be noted that the levels of the inclination error signals $s_{13}$ and $s_{14}$ are not positively proportional to the error angle because the locus of movement within the range is not linear.

The subtracter 26 outputs a height error signal $s_{16}$ which corresponds to a level difference $(Va_1 - Vb_1)$ between the TE voltage signals $s_{51}$ and $s_{53}$. The subtracter 27 outputs a height error signal $s_{17}$ which corresponds to a level difference $(Va_2 - Vb_2)$ between the TE voltage signals $s_{52}$ and $s_{54}$. As noted from the description of FIGS. 5D and 5E, the level of the height error signals $s_{16}$ and $s_{17}$ appears as a positive voltage when the height of the head hb relative to the height of the head ha on reproducing is lower than the height of the had hb relative to the height of the head ha on recording and as a negative voltage when that the former is higher than the latter and the magnitude thereof is approximately proportional to the height error.

It should be noted that the aforementioned relation can be established only when the differential voltages $Va_1$, $Va_2$, $Vb_1$ and $Vb_2$ fall within the range wa of FIG. 5D. Also, it should be noted that the level of the height error signals $s_{16}$ and $s_{17}$ are not positively proportional to the height error because the locus of movement within the range is not linear.

Although, in the embodiment of FIG. 1, the inclination error signal $s_{15}$ may be formed by adding the inclination error signals $s_{13}$ and $s_{14}$ by the adder 28, it will be considered that the information the signals have are approximately identical to each other. Also, the height error signal $s_{18}$ may be formed by adding the height error signals $s_{16}$ and $s_{17}$ by the adder 29, it will be considered that the information the signals have are approximately identical to each other.

Figure 8B:
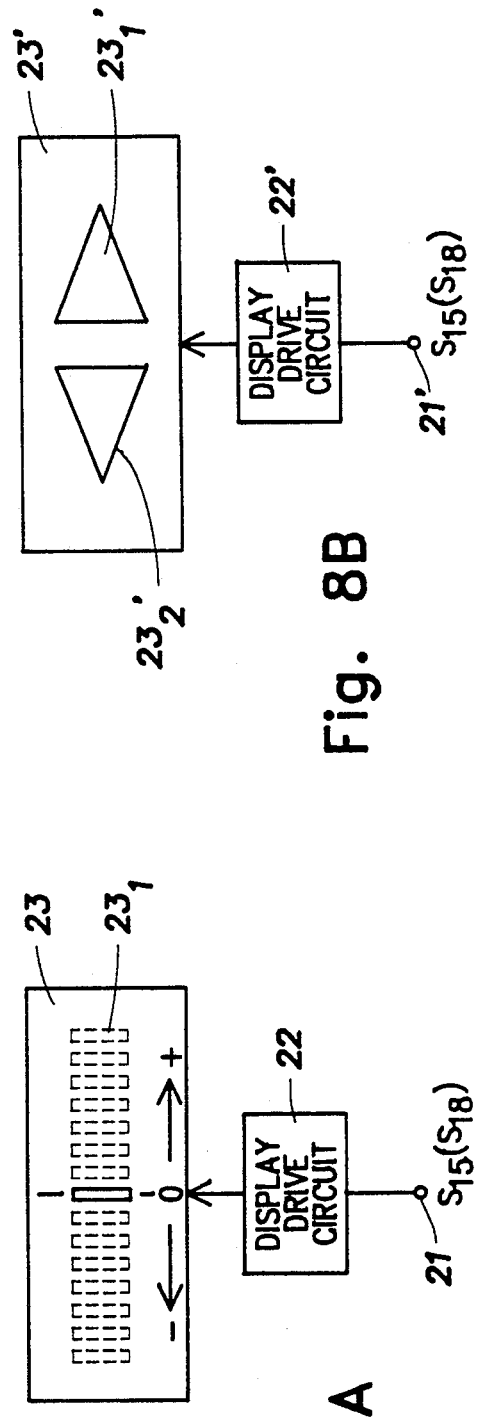
FIGS. 8A and 8B illustrate examples using the circuit of the invention.
Figure 8A:
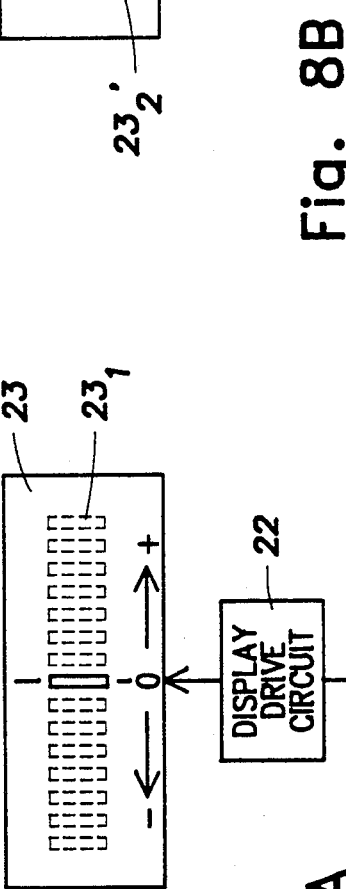

FIGS. 8A and 8B illustrate examples of using the circuit of the invention to visually confirm the inclination error and/or the height error on the error signals $s_{15}$ and $s_{18}$.

As noted from FIG. 8A, a display drive circuit 22 at its input terminal 21 receives the error signals to light dots on a display 23 corresponding to the signal level. If the input level of the error signal is positive, then the display 23 is lit in a positive direction from the zero position to the dot position proportional to the input level. Similarly, if the input level is negative, then the display 23 is lit in a negative direction from the zero position to the dot position proportional to the input level. If the input level is zero, then the display is lit only at the zero dot position. When the input level is not zero, the display 23 may be lit in the corresponding direction at all the dot positions including the zero position.

Alternatively, as shown in FIG. 8A, a display drive circuit 22' at its input terminal 21' inputs the error signals to light either of arrow indicated portions $23'_1$ and $23'_2$ of a display 23' in accordance with the positive and negative directions of the error signals. In this case, if the input signal level is zero, then both of the arrow indicated portions are lit.

Figure 9:
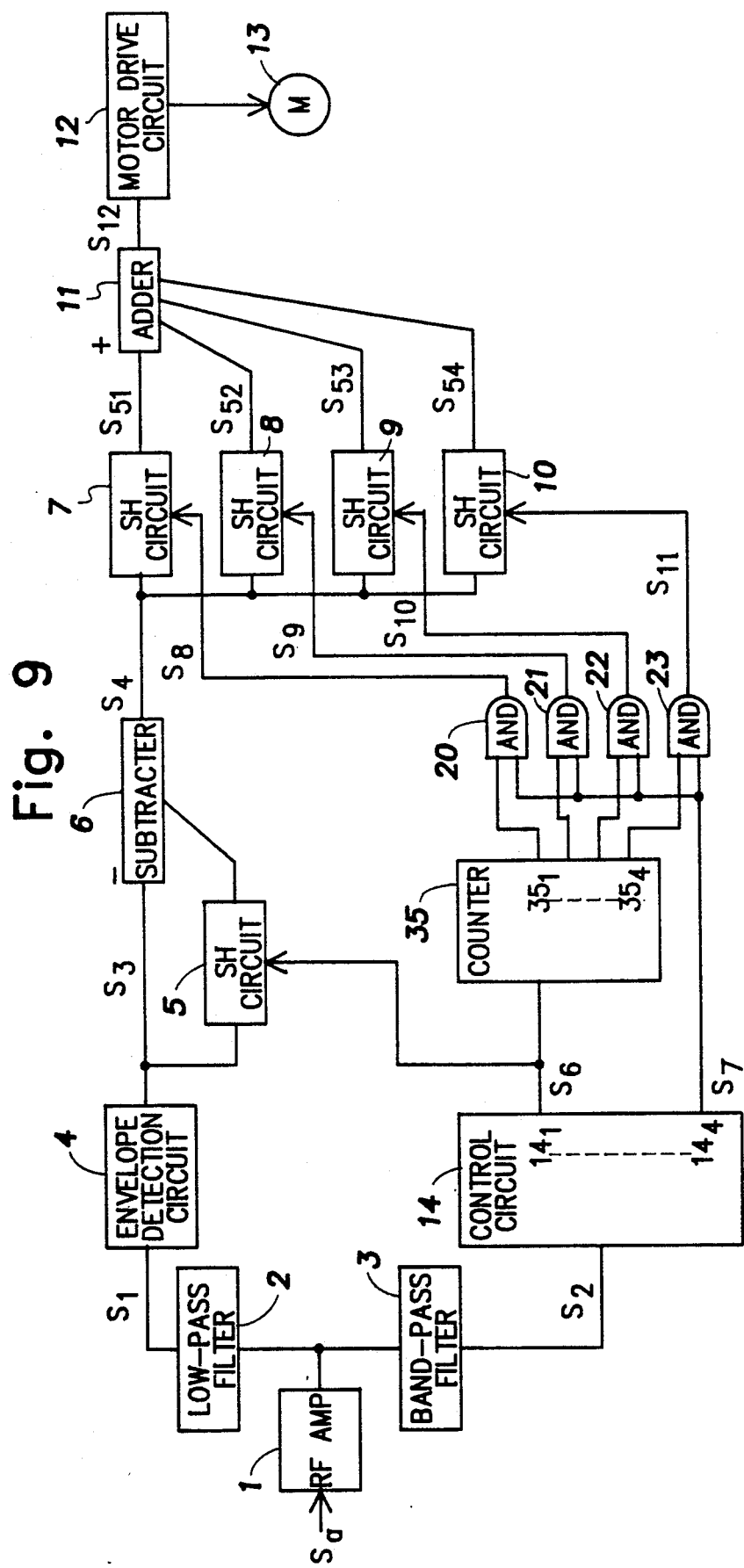
FIG. 9 is a schematic diagram of a tracking error detection circuit constructed in accordance with another embodiment of the invention.

FIG. 9 shows a tracking error detection circuit constructed in accordance with another embodiment in which the same numerals designate the same components as those of FIGS. 1 and 7. In this embodiment, there is provided a tetra-coded counter 35 which receives the pulse control signal $s_6$ from the control circuit 34 to sequentially convert the state of its output terminals $35_1$, $35_2$, $35_3$ and $35_4$ into the state of "H". The output terminals $35_1$, $35_2$, $35_3$ and $35_4$ of the counter 35 are connected to the AND gates 20 through 23 at their one input terminal. The AND gates 20 through 23 at their other input terminals receive the pulse control signal $s_7$ appearing in synchronization with the control signal $s_6$ to output the AND signals $s_8$ through $s_{11}$, as shown in FIGS. 6E-6J, which are in turn supplied to the SH circuits 7 through 10 in the same manner as described in the embodiment of FIG. 1. Since the operation of the embodiment of FIG. 9 is identical to that of FIG. 1 with respect to the detection of tracking error, it will be omitted. However, it will be noted that the detection of FIG. 9 does not detect the angle error of the rotary drum and the inclination error of the heads.

It will be noted from the foregoing, the inclination error of the rotary drum and the height error of the pair of heads can be easily detected by the invention. Thus, accurate tracking without error of inclination and height can be accomplished by using rotary drum inclination correcting means and head height correcting means operated by the error information from the circuit of the invention. Also, variation in the DAT apparatus during its production can be checked by the circuit of the invention which may be provided in the manufacturing process.

Furthermore, the tracking error voltage signals tending to vary due to the inclination error of the rotary drum and the height error of the heads can be averaged by the invention without any smoothing circuit. This advantageously enables ATF control at high response and in a stable manner.

Although some embodiments of the invention have been described and illustrated with reference to the accompanying drawings, it will be apparent from those skilled in the art that they are by way of examples, and that various changes and modifications may be made without departing from the spirit and scope of the invention, which is intended to be defined only by the appended claims.

What is claimed is:

1. A tracking error detection circuit for a helical scanning type magnetic reproducing apparatus including a rotary drum having a first head and a second head provided on the periphery thereof for reproducing pilot signals recorded at a first area and a second area on tracks of a magnetic tape, said first area and second area being adjacent to respective widthwise edges of said tape, whereby a tracking error on reproduction is detected based on the pilot signals, said tracking error detection circuit comprising:

a first sample and hold circuit to sequentially sample and hold a level difference between the pilot signals on adjacent tracks detected by said first head with different first and second timings in synchronization with a detection of a synchronizing signal recorded on first tracks corresponding to said first head on said first area;

a second sample and hold circuit to sequentially sample and hold a level difference between the pilot signals on adjacent tracks detected by said first head with different first and second timings in synchronization with a detection of a synchronization signal recorded on said first tracks corresponding to said first head on said second area;

a third sample and hold circuit to sequentially sample and hold a level difference between the pilot signals on adjacent tracks detected by said second head with different first and second timings in synchronization with a detection of a synchronizing signal recorded on second tracks corresponding to said second head on said first area;

a fourth sample and hold circuit to sequentially sample and hole a level difference between the pilot signals on adjacent tracks detected by said second head with different first and second timings in synchronization with a detection of a synchronizing signal recorded on said second tracks corresponding to said second head on said second area;

and an adder to add outputs from said first through fourth sample and hold circuits.

* * * * *